May 15, 1928.  W. J. BELCHER  1,670,278

SILENT CHAIN DRIVE

Filed Aug. 30, 1926  2 Sheets-Sheet 1

Inventor
Warren J Belcher
By his Attorney Gifford & Scull

May 15, 1928.  
W. J. BELCHER  
1,670,278  
SILENT CHAIN DRIVE  
Filed Aug. 30, 1926 2 Sheets-Sheet 2
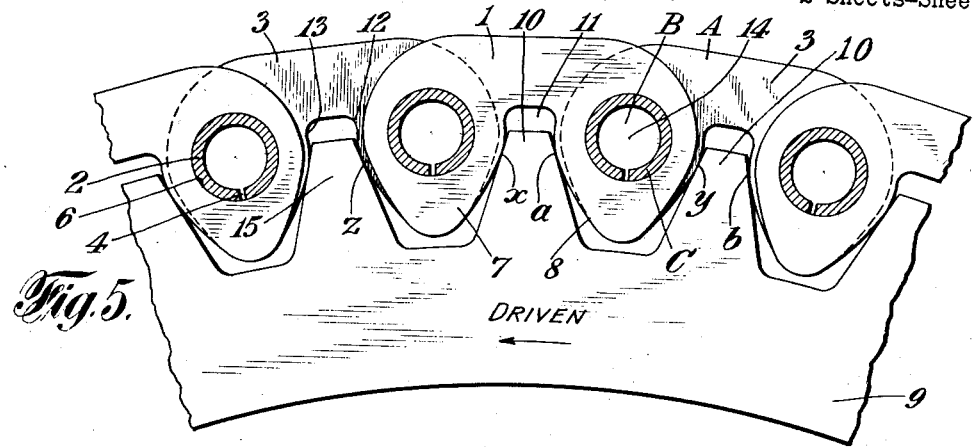
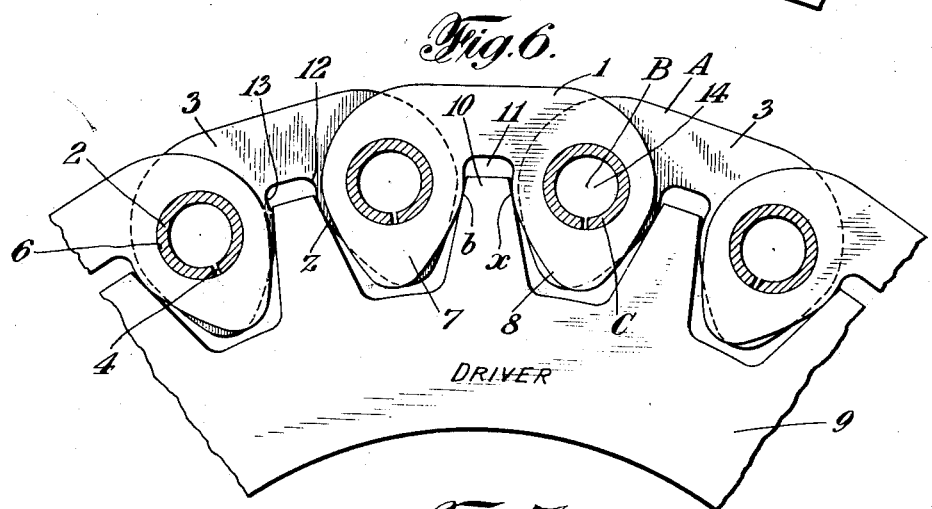
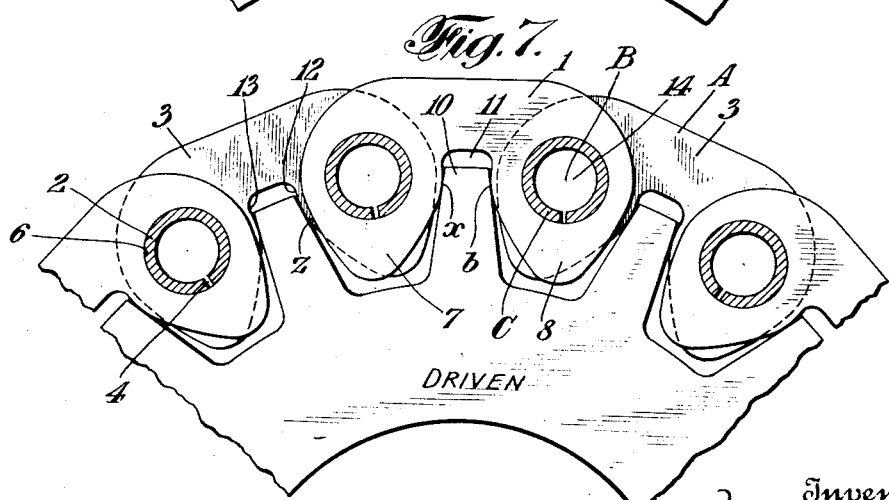
Inventor  
Warren J. Belcher  
By his Attorneys  
Gifford & Scull Patented May 15, 1928.

1,670,278

UNITED STATES PATENT OFFICE.

WARREN J. BELCHER, OF HARTFORD, CONNECTICUT, ASSIGNOR TO THE WHITNEY MFG. COMPANY, OF HARTFORD, CONNECTICUT, A CORPORATION OF CONNECTICUT.

SILENT-CHAIN DRIVE.

Application filed August 30, 1926. Serial No. 132,378.

My invention relates to silent chain drives and particularly to such drives for the front ends of automombiles.

In the perfected automobile of today the use of silent chains of the link type is rapidly increasing. The requirements of such chains are also rapidly increasing, particularly in that such chains are now required to be quiet in operation, efficient and to have a long, useful life. These requirements are not easy of fulfillment under the difficult requirements of the high speed automobile.

I have devised a chain in some respects similar to that shown in my prior Patent No. 959,046 of May 24, 1910, but improved in many respects so that it fulfills all the above-mentioned requirements while being very simple in construction and easy to manufacture.

My invention will be better understood by reading the following description taken in connection with the accompanying drawings, in which:

Fig. 5 is a side elevation of a part of a chain and a sprocket having 42 teeth;

Fig. 6 is a view similar to view 5 and a sprocket of 21 teeth; and

Fig. 7 is a view similar to view 5 and a sprocket of 15 teeth.

Figure 4:
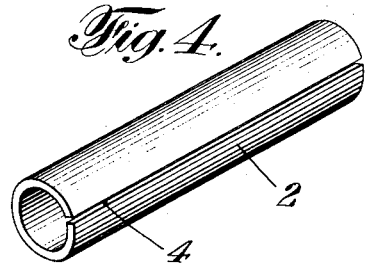
Fig. 4 is a perspective view of the pintle bushing before having its end riveted.

Referring to the drawings, the chain comprises a series of link elements 1 having openings in the ends thereof, through which pintles 2 pass. The elements 1 constitute one link and elements 3 constitute another link. All of the elements are identical in size and shape. The pintles are also identical as to size and shape. As shown in Fig. 4, the pintles which I prefer to use are made from a straight cylindrical bushing, which is made into the form shown by automatic machinery. Between the edges of the metal piece is provided a slot 4 extending throughout the length of the bushing. This slot is provided for the purpose of giving a slight resiliency to the chain and also for the purpose of allowing the lubricant to have more ready access to the bearing surfaces of the link elements on the pintle. The slot 4 may be omitted, and most, if not all, of the advantages of my invention secured, but I prefer to have the slots in the pintles. Other forms of pintles may be used, as, for instance, solid pins or two-part pintles to form what are known as rocker joints.

Figure 2:
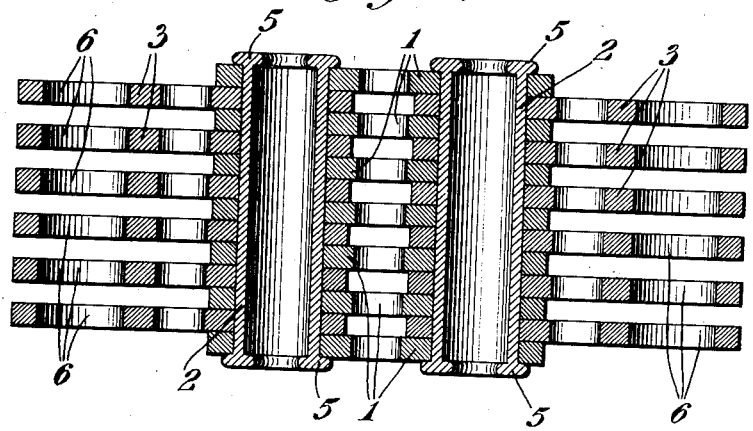
Fig. 2 is a section on line 2—2 of Fig. 1.

In assembling the chain, the elements 1 and 3 can be assembled by automatic machinery, the pintle bushings 2 slipped in place and the ends of the bushings riveted as shown at 5 in Fig. 2. This riveting of the ends of the bushings acts to hold the link elements in proper lateral relation to each other and is preferably done by the method disclosed in my Patent No. 1,649,834.

Figure 1:
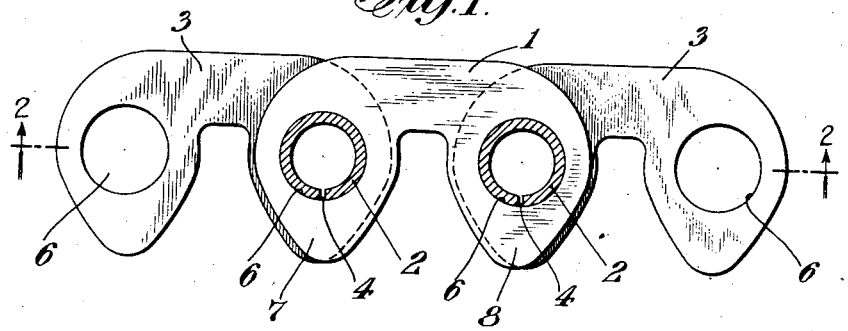
Fig. 1 is a side elevation of a part of a chain with the pintles shown in section.
Figure 3:
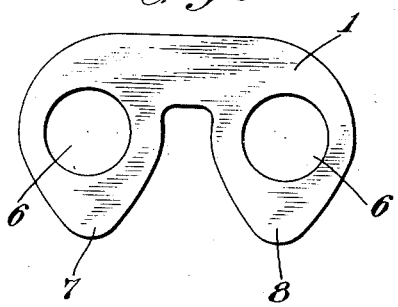
Fig. 3 is a side elevation of one of the link elements.

The openings 6 in the ends of the link elements are circular, as shown in Figs. 1 and 3, but if other forms of pintles than those shown are used these holes will be made accordingly. These openings would be different in form for other types of joints herein mentioned.

One of the desirable features of a chain drive mechanism for use on automobiles, is that the teeth of the sprockets and the teeth on the chain links shall be of such form that the sprockets may be readily and cheaply manufactured in large quantities. The ideal sprocket is one which has teeth with perfectly straight sides and tops so that the sprocket can be made by taking a suitable piece of metal in cylindrical form and hobbing the same to produce the sprocket. I have, accordingly, designed my chain in such manner that it is adapted to sprockets of the type above mentioned and so that it also runs quietly on a sprocket having many or few teeth of the above described configuration. It also runs quietly on teeth of other configurations. Some automobiles are so designed that the chain drive must run on three sprockets all having different numbers of teeth, for instance, 42 teeth, 21 teeth and 15 teeth. In this particular arrangement, the 21 tooth sprocket is the driver and the other two sprockets are driven by the chain. In so far as the action of the chain is concerned, however, it makes no difference because the action is identical whether the chain is being driven or whether the sprocket is being driven. In Figs. 5, 6 and 7, I have illustrated my chain on sprockets having 42, 21 and 15 teeth, respectively. It will be noted that in the sprocket having the greater number of teeth, the sides of the teeth are at a greater angle to each other than in the sprockets having a smaller number of teeth. My chain is arranged so that the teeth 7 and 8 of a given link both bear on the sides of the same tooth. For instance, in Fig. 5 chain tooth 7 bears upon the sprocket tooth at the point $x$ and the chain tooth 8 bears upon the sprocket tooth at the point $a$. Assuming the rotation to be in the direction of the arrow and assuming that one sprocket 9 is being driven by the chain, obviously the surfaces carrying the load are at the points $b$ on the tooth 10 and corresponding points on the other teeth as they come into position. As any given link comes into position upon the sprocket the curvature of the chain tooth is such that it first engages the sprocket tooth near the outer end of the tooth and then slides into the final position $y$ as the sprocket rotates and the given link becomes fully seated in position astride the tooth.

In Figs. 5, 6 and 7, it will be noted that the adjacent links are pivoted together by the pintles 2. The inside surfaces of the link teeth are so designed relative to the openings 6 in the link elements that when one link is astride a tooth the inside surface of the adjacent link tooth bears against the face of the adjacent sprocket tooth. In Fig. 5 these points of contact are designated $x$, $a$ and $y$, the points $x$ and $a$ being on the link elements 1, and $y$ being on the elements 3. The pintles hold these parts in such positions that the inside surfaces of the link elements constituting adjacent links form, in effect, a cylindrical member, one side of which bears against one sprocket tooth and the other side of which bears against the side of the adjacent sprocket tooth. There are, therefore, three points of contact to be considered in connection with each chain link, including its joint. Two of these points are the inside surfaces of a given chain link and the third is the inside surface of the adjacent link engaging the side of the adjacent sprocket tooth. As an illustration, the three points for the link A are $b$, $y$ and $a$. The point $a$ is effective through the joint B including the pintle C. The action of the "cylindrical members" between the sprocket teeth reduces the wear between the chain and the sprocket and also assists in preventing the links astride the sprocket teeth from wedging down on the sprocket teeth. The above described actions take place as a given link goes into position astride a tooth. It has been observed that when the chain is under load the contact between the link elements and the sprocket tooth is partially or wholly relieved at the point $y$ when the elements A are in final position. This is relatively unimportant as the elements in question have taken their final position on the sprocket.

While the elements contact with both sides of the teeth they are astride of during the cycle of operation, they do not necessarily contact with both sides of the sprocket tooth simultaneously throughout the cycle. For instance, as the element A comes into position in Fig. 5 the front link tooth engages sprocket tooth 10 and then the trailing tooth engages the other side of tooth 10. At this time there is simultaneous engagement of both sides of the tooth 10. As the cycle proceeds the front tooth may be relieved at $y$ and then only one side of tooth 10 is engaged. The contact points change initial positions according to the number of teeth in the sprockets. The greater the number of teeth, the lower the contact point on the sprocket teeth, but the links, with their joints, are so formed that in operation the centers of the pintles are maintained approximately on the pitch line or pitch circle of the chain regardless of the number of sprocket teeth.

By referring to Figs. 5, 6 and 7, it will be noted that the point of contact between the chain teeth and the sprocket teeth is nearer the end of the sprocket teeth the smaller the diameter of the sprocket. In other words, in Fig. 7 this point of contact is nearer the end of the sprocket teeth than it is in Fig. 5, but in all instances the pintles are approximately on the pitch line of the chain.

In order that there may be a contact between the chain teeth and sprocket teeth at the points $x$ and $a$ after the chain has been run over the sprockets a sufficient length of time to cause a certain amount of wear, I have provided a clearance space 11 between the top of the sprocket teeth and the body of the link elements. In order to avoid undue wear and friction, I have also slightly flared this clearance space between the top of the sprocket teeth, as shown at 12 and 13.

Because of the arrangement in which the inside surfaces of the link elements straddle the teeth and form the working surfaces between sprocket and chain, the effective pitch of the chain is materially decreased, because the working surface $a$ of Fig. 5 is located much nearer the pivotal point 14 of that element than it would be if the bearing surface were between the external surface of the tooth 7 and the sprocket tooth 15, as, for instance, at the point $z$. In fact, a chain made in accordance with my invention and having a ½ inch pitch has, in effect, a pitch of only about 11/64ths of an inch. The smaller the pitch of a given chain, the quieter the chain operates. Therefore, the arrangement which I have produced for effectively shortening the pitch has decided advantage in that it renders the chain much smoother and quieter.

If desired, the space 11 between the body of the link elements and the tops of the sprocket teeth may be so proportioned as to limit or regulate the elongation of the chain due to wear between the chain links and sprocket teeth but ordinarily, the action is such that this feature may be disregarded, as the chain and sprocket do not wear enough within a reasonable time to make this feature of any consequence. The arrangement shown and described has many advantages over constructions where the chain teeth engage the sprocket between the teeth or where the sprocket teeth engage the chain links between the chain teeth.

Another feature of my chain is that the contacting surfaces between the chain teeth and sprocket teeth are so coordinated that they are in contact during the period or interval of flexure.

This has the desirable feature of relieving the friction between the pintles and links and materially decreasing the wear at the joints. This also contributes to the noiselessness of the chain. As an example, the contracting surfaces of the chain and sprocket at $a$, $y$ and $b$ are so coordinated that the pintle C is relieved of a part or all of the chain load during the interval of flexure.

I consider that the chief advantages flowing from my invention are the results of the combination of the elements above described. In my opinion, this combination results in a noiseless, efficient and durable chain drive. Therefore, many changes may be made in the details of the various parts without departing from the spirit of my invention.

I claim:

1. In a chain drive, the combination of sprockets having spaced teeth, a link chain having spaced teeth, means for connecting the overlapping ends of adjacent chain link elements and adapted to carry the load of the chain between the sprockets and means including the coordinated contacting surfaces of sprocket teeth and link teeth for relieving the connecting means of a portion of the chain load during the interval of flexure of the joints.

2. In a chain drive, the combination of sprockets having spaced teeth, a link chain having teeth spaced apart to engage the sprocket teeth, pintles between the links, the form of the coordinated contacting surfaces of the link teeth and sprocket teeth being such that a portion of the load on the pintles is relieved during the interval of flexure of the joints between the chain links.

3. In a chain drive, the combination of sprockets having spaced teeth, a jointed link chain, each link having a tooth at each end, the link teeth and the sprocket teeth being spaced so that each link straddles a sprocket tooth and engages both sides of a sprocket tooth, the contacting surfaces of the link teeth and sprocket teeth being such that the joint is relieved of a portion of its load during the flexing of the joint.

4. The combination of a jointed link chain, a flexible pivot between the links, a toothed sprocket over which said chain passes, teeth on the links so spaced that the teeth on one link engage opposite faces of a sprocket tooth, the contacting surfaces of the link teeth and sprocket teeth being such that a part of the load on the pin is relieved during the flexing of the chain joint.

5. In a chain drive, the combination of a sprocket having spaced teeth, a link chain having teeth spaced apart on each link, pintles passing through adjacent overlapping link elements, said teeth on the link elements being adapted to engage both sides of a sprocket tooth and a contact surface on the link elements of an adjacent link engaging the side of an adjacent sprocket tooth.

6. In a chain drive, the combination of a sprocket having spaced teeth, a link chain having teeth spaced apart on each link, pintles passing through adjacent overlapping link elements, said teeth on the link elements being adapted to engage both sides of a sprocket tooth and a contact surface on the link elements of an adjacent link engaging the side of an adjacent sprocket tooth and a space between the link elements and the tops of the sprocket teeth.

7. A chain having links, pivot pintles joining the links together, said links having projecting end portions whereby recesses are provided to fit the ends of sprocket teeth, the link members being adapted to be seated astride the teeth which they drive and formed so that the two interior surfaces of adjacent chain teeth constitute in effect a roller adapted to be seated on a sprocket between the faces of two adjacent sprocket teeth.

8. A chain having links, pivot pintles joining the links together, said links having projecting end portions whereby recesses are provided to fit the ends of sprocket teeth, the link members being adapted to be seated astride the teeth which they drive and formed so that the two interior surfaces of adjacent chain teeth constitute in effect a roller adapted to be seated on a sprocket between the faces of two adjacent sprocket teeth irrespective of the number of teeth on the sprocket.

9. In a chain, a plurality of overlapping link elements, pintles at the overlapped portions forming a joint, projections on the link elements collectively constituting a chain tooth, the projections on the link elements on one side of the joint being adapted to engage opposite faces of the same sprocket tooth and the projections constituting the remainder of the said chain tooth being adapted to engage the face of an adjacent sprocket tooth.

10. In a chain, a plurality of overlapping link elements, pintles at the overlapped portions forming a joint, projections on the link elements collectively constituting a chain tooth, the projections on the link elements on one side of the joint being adapted to engage opposite faces of the same sprocket tooth and the projections constituting the remainder of the said chain tooth being adapted to engage the face of an adjacent sprocket tooth, whereby the chain joints are maintained substantially on the pitch line, and the joint relieved of a part of its load during the flexing thereof.

11. In a link chain, a plurality of link elements overlapping at their ends, teeth on the chain link elements adapted to rest astride the sprocket teeth and engage both faces of each driven tooth, split hollow pins passing through the overlapping ends of said chain links, thereby affording a slight elasticity at each joint.

12. In a link chain, a plurality of link elements overlapping at their ends, teeth on the chain link elements adapted to rest astride the sprocket teeth and have effective engagement with both sides of the sprocket tooth they are astride of and to remain out of engagement with the sprocket at any other point, and pins passing through the overlapping ends of said chain links.

13. A chain having a plurality of link elements, single element pivot pintles for joining the link elements together, said link elements having projecting portions whereby recesses are provided to fit the ends of sprocket teeth, the link elements being adapted to be seated astride the teeth they drive and the engaging surfaces of the chain teeth and sprocket being such that the pintle is relieved of a portion of the chain load during the flexing of the joint.

14. A chain having links composed of a plurality of elements, said link elements of adjacent links being overlapped at their ends, pins passing through round openings in said overlapped elements, said pins being composed of a single-piece hollow bushing having a slot extending longitudinally of the pin and substantially throughout the length thereof, tooth-forming portions on said elements, said portions on the elements of one link being so formed that they ride astride the sprocket teeth and the portions of the overlapping ends of elements of adjacent links being so coordinated therewith that the pressure between a pin and the elements pivoted thereon is relieved as the joint flexes.

15. In combination, a sprocket, a toothed chain and pins connecting the links of the chain, the chain teeth and sprocket teeth being so disposed that when fully engaged adjacent sprocket teeth substantially form the connection between adjacent links, whereby the pins connecting the links are relieved to some extent.

16. A chain link element containing two teeth adapted to straddle a sprocket tooth, a hole near each end adapted to contain a pintle, the distance from the pintle axis of each hole to the interior face of its tooth being the same as the distance from the pintle axis of the other hole to the interior face of its tooth, said distances being greater than the distances from the pintle axes of the holes to the exterior faces, whereby when the element is in place on the sprocket only said interior surfaces engage the sprocket teeth.

17. A chain link element having symmetrical toothed ends, each having a pintle opening and in which each tooth is so disposed with respect to the axis of its pintle hole that the interior sprocket engaging face of the tooth is at a greater distance from the axis of the pintle hole than is its exterior face, whereby when the element is in place on the sprocket only said interior surfaces engage the sprocket teeth.

WARREN J. BELCHER.